(12) United States Patent
Sekiguchi et al.

(10) Patent No.: US 9,920,441 B2
(45) Date of Patent: Mar. 20, 2018

(54) OZONE WATER GENERATING DEVICE

(71) Applicant: NIKKA MICRON CO., LTD., Misato-shi, Saitama (JP)

(72) Inventors: Shigeo Sekiguchi, Misato (JP); Kazutaka Murata, Misato (JP)

(73) Assignee: NIKKA MICRON CO., LTD., Saitama (JP)

( * ) Notice: Subject to any disclaimer, the term of this patent is extended or adjusted under 35 U.S.C. 154(b) by 0 days.

(21) Appl. No.: 14/396,683

(22) PCT Filed: Apr. 19, 2013

(86) PCT No.: PCT/JP2013/061617
§ 371 (c)(1),
(2) Date: Jan. 30, 2015

(87) PCT Pub. No.: WO2013/161699
PCT Pub. Date: Oct. 31, 2013

(65) Prior Publication Data
US 2015/0129419 A1 May 14, 2015

(30) Foreign Application Priority Data
Apr. 27, 2012 (JP) ................................. 2012-101984

(51) Int. Cl.
*C25B 1/13* (2006.01)
*C25B 9/08* (2006.01)
(Continued)

(52) U.S. Cl.
CPC ............ *C25B 13/04* (2013.01); *C02F 1/4672* (2013.01); *C25B 1/13* (2013.01); *C25B 9/08* (2013.01);
(Continued)

(58) Field of Classification Search
CPC ... C25B 13/04; C25B 1/13; C25B 9/08; C02F 1/4672; C02F 2201/46142;
(Continued)

(56) References Cited

U.S. PATENT DOCUMENTS 5,686,051 A 11/1997 Shiota et al.

FOREIGN PATENT DOCUMENTS

JP 08134678 A 5/1996
JP 2002292370 A 10/2002
(Continued)

OTHER PUBLICATIONS

International Preliminary Report on Patentability (IPRP) dated Oct. 28, 2014 issued in International Application No. PCT/JP2013/061617.
(Continued)

*Primary Examiner* — Ciel P Thomas
(74) *Attorney, Agent, or Firm* — Holtz Holtz & Volek PC

(57) ABSTRACT

An ozonated water generating device includes a first housing, a second housing on the first housing, and a catalytic electrode disposed in a space in the first and second housings. The catalytic electrode includes an anode, a cation exchange membrane, and a cathode. The device includes a cushion at least one between the anode and the first housing and between the cathode and the second housing, and at least one pusher in at least one of the first housing and the second housing. The pusher penetrates the first or second housing to push the cushion toward the catalytic electrode, or to directly push the catalytic electrode. The pusher is positioned to ensure pushing on at least the center of the catalytic electrode. And the pressure of the pusher brings the anode, the cation exchange membrane, and the cathode into pressure contact with each other.

4 Claims, 7 Drawing Sheets

(51) Int. Cl.
      *C25B 13/04*       (2006.01)
      *C02F 1/467*       (2006.01)
      *C02F 1/461*       (2006.01)

(52) U.S. Cl.
      CPC ............... *C02F 2001/46142* (2013.01); *C02F 2201/4614* (2013.01); *C02F 2201/4617* (2013.01); *C02F 2201/46115* (2013.01); *C02F 2209/23* (2013.01)

(58) Field of Classification Search
      CPC .... C02F 2201/46115; C02F 2201/4614; C02F 2201/4617; C02F 2209/23
      See application file for complete search history.

(56) References Cited

FOREIGN PATENT DOCUMENTS

| JP | 2006124750 A | 5/2006 |
| JP | 2008279341 A | 11/2008 |

OTHER PUBLICATIONS

International Search Report (ISR) dated Aug. 6, 2013 issued in International Application No. PCT/JP2013/061617.
Japanese Office Action (and English translation thereof) dated Jun. 19, 2012, issued in counterpart Japanese Application No. 2012-101984.
Chinese Office Action dated Mar. 2, 2016, issued in counterpart Chinese Application No. 201380022327.2.
Chinese Office Action (and English translation thereof) dated Nov. 3, 2016, issued in counterpart Chinese Application No. 201380022327.2.

OZONE WATER GENERATING DEVICE

TECHNICAL FIELD

The present invention relates to an ozonated water generating device.

BACKGROUND ART

In recent years, ozonated water has been used for various purposes, such as the sterilization of food and the deodorization of malodorous gas. Furthermore, many findings about the ozonated water have been reported in the medical and nursing-care fields. The semiconductor production also needs the ozonated water, which exhibits characteristic ozone oxidation to hyperfine structures.

The ozonated water is typically generated through direct electrolysis (e.g., refer to Patent Document 1). In the direct electrolysis, feed water is brought into direct contact with the electrolytic surface of catalytic electrode, which includes a cation exchange membrane, and an anode and a cathode in pressure contact with the cation exchange membrane on the respective surfaces, to be electrolyzed into ozonated water.

In a typical procedure for the pressure contact between the anode or cathode and the cation exchange membrane, for example, as illustrated in FIGS. 8A and 8B, a pushing screw 41 is tightened in a housing 11 stacked on a grating 34 disposed on an anode 32 to urge the anode 32 against a cation exchange membrane 31. In FIG. 8, the housing 11 has a feed-water supplying path 5 and an ozonated-water discharging path 6 for discharging the resulting ozonated water, which penetrate through the housing 11 to the cation exchange membrane 31. Feed water supplied through the feed-water supplying path 5 comes into contact with the anode 32 and the cation exchange membrane 31, and the resulting ozonated water is then discharged through the ozonated-water discharging path 6. It is noted that a cathode (not shown) is disposed below the cation exchange membrane 31.

PRIOR ART DOCUMENT

Patent Document

Patent Document 1: JP H8-134678A

SUMMARY OF INVENTION

Problem to be Solved by the Invention

After the pushing screw 41 is tightened in the stack to urge the grating 34 and the anode 32 against the cation exchange membrane 31, a gap S appears between the housing 11 and the grating 34, as illustrated in FIG. 8B. The feed water supplied through the feed-water supplying path 5 of the housing 11 thus flows into the gap S. This configuration, which allows feed water to flow in such an unintended portion, cannot efficiently supply feed water to the cation exchange membrane 31. The configuration thus has decreased efficiency of generating ozonated water and cannot generate concentrated ozonated water.

An object of the invention, which has been accomplished to solve the above problems, is to provide an ozonated water generating device that can generate concentrated ozonated water with high efficiency.

Means for Solving the Problem

The invention provides an ozonated water generating device including:

a first housing;
a second housing stacked on the first housing; and
a catalytic electrode disposed in an accommodating space defined in the stack of the first housing and the second housing, the catalytic electrode comprising an anode, a cation exchange membrane, and a cathode in sequence from the first housing, wherein the ozonated water generating device supplies feed water to the catalytic electrode and applies DC voltage across the anode and the cathode to generate ozonated water, the first housing comprises an anodic supplying path and an anodic discharging path in communication with the accommodating space, the anodic supplying path supplying feed water to the anode of the catalytic electrode, the anodic discharging path discharging resulting water, the second housing comprises a cathodic supplying path and a cathodic discharging path in communication with the accommodating space, the cathodic supplying path supplying feed water to the cathode of the catalytic electrode, the cathodic discharging path discharging resulting water, the ozonated water generating device further comprises a cushion at at least one of a position between the anode and the first housing and a position between the cathode and the second housing, the ozonated water generating device further comprises at least one pusher in at least one of the first housing and the second housing, the pusher penetrating through the first housing or the second housing to push the cushion toward the catalytic electrode or penetrating through the first housing or the second housing to directly push the catalytic electrode, the pusher is disposed at a position that ensures pushing on at least the center of the catalytic electrode, and the pressure of the pusher on the catalytic electrode brings the anode, the cation exchange membrane, and the cathode into pressure contact with each other.

Preferably, the at least one pusher comprises a plurality of pushers, and the pushers are disposed at regular intervals at positions that ensure pushing on at least the center of the catalytic electrode.

Preferably, the cushion is made of silicone.

Effects of Invention

The invention can achieve generation of concentrated ozonated water with high efficiency.

DESCRIPTION OF EMBODIMENTS

An embodiment of the invention will now be described with reference to the drawings.

Figure 1:
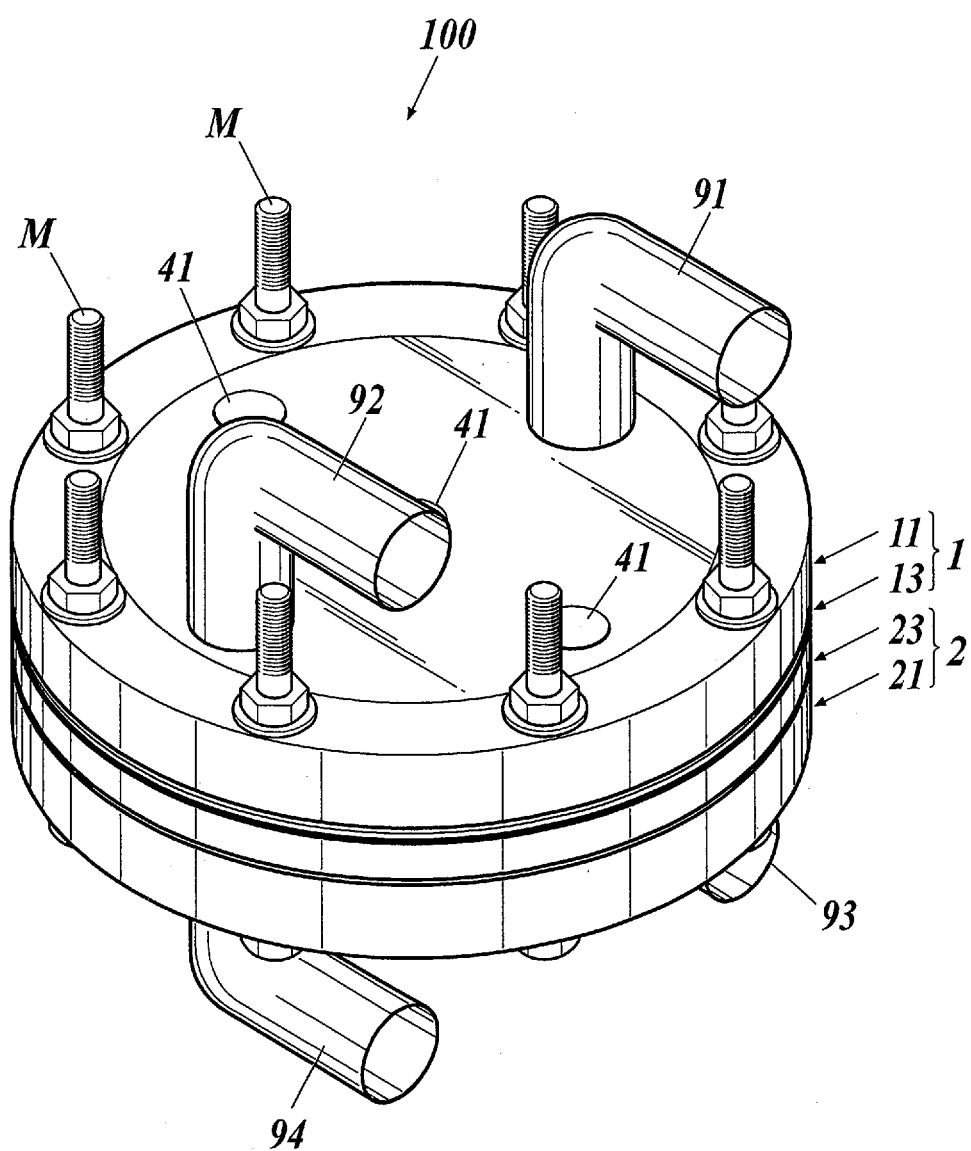
FIG. 1 This is a perspective view of the appearance of an ozonated water generating device.
Figure 2:
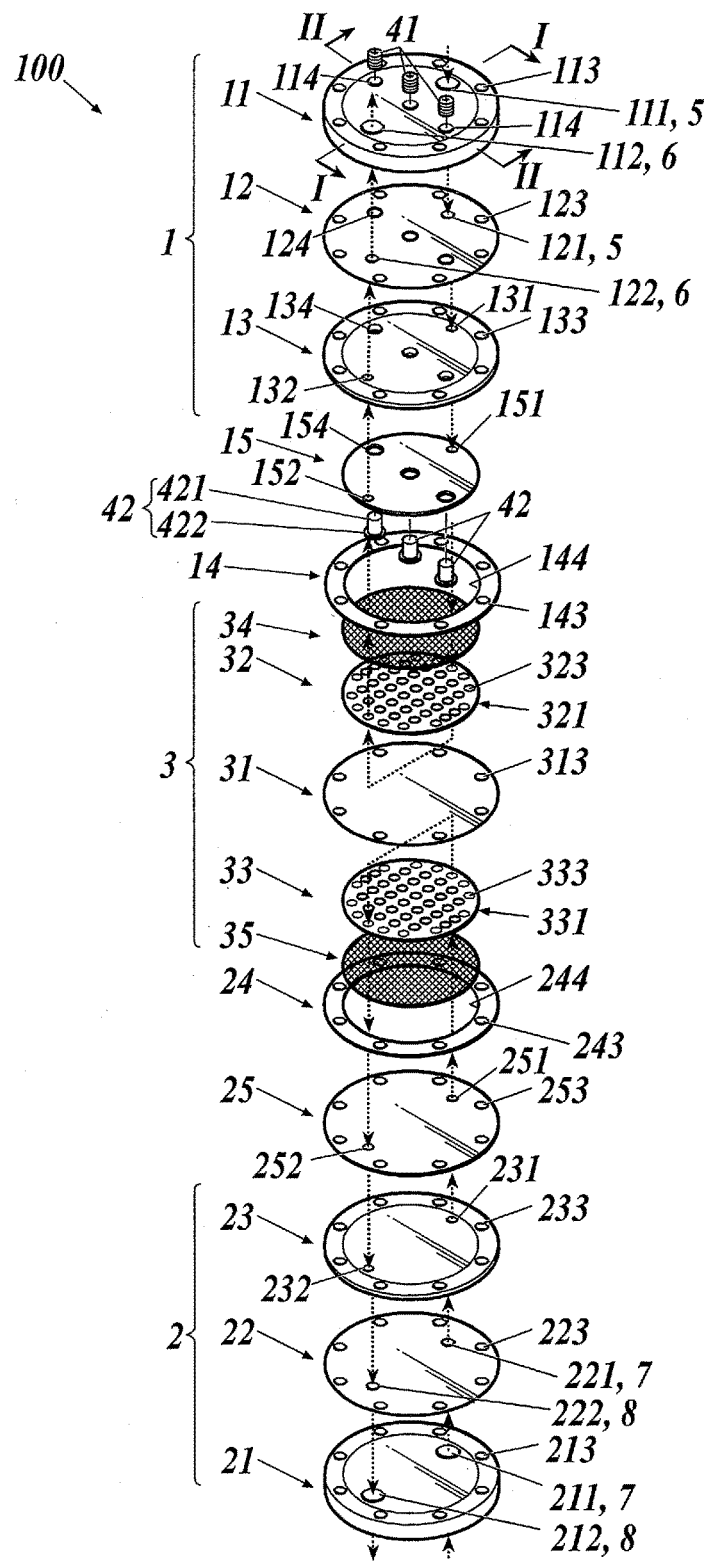
FIG. 2 This is an exploded perspective view of an ozonated water generating device.
Figure 3:
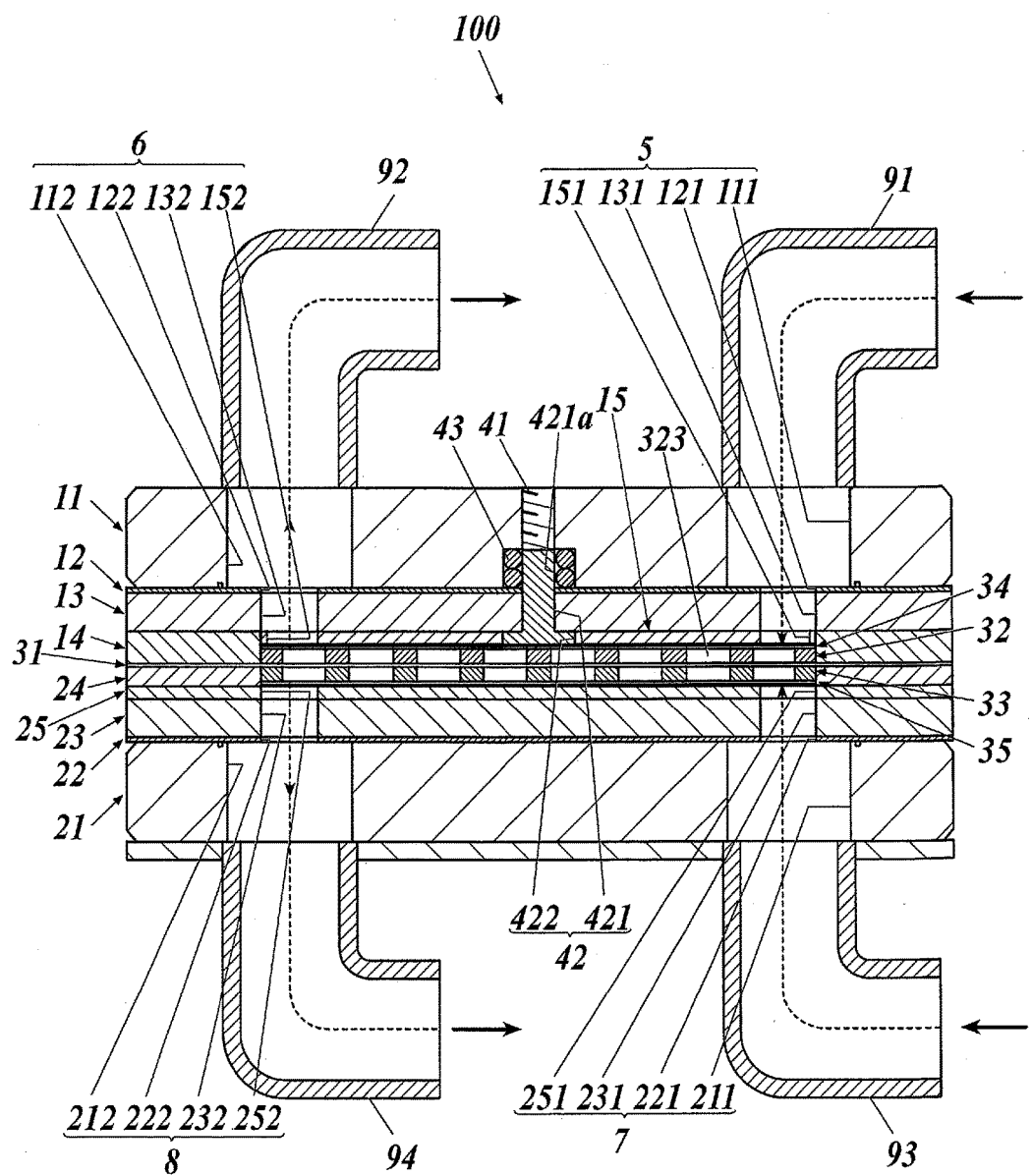
FIG. 3 This is a cross-sectional view along a line I-I in FIG. 2.

FIG. 1 is a perspective view of the appearance of an ozonated water generating device. FIG. 2 is an exploded perspective view of the ozonated water generating device. FIG. 3 is a cross-sectional view along a line I-I in FIG. 2.

With reference to FIGS. 1 to 3, an ozonated water generating device 100 according to the invention includes a first housing 1, a second housing 2 that underlies the first housing 1, and a catalytic electrode 3 disposed in accommodating spaces 144, 244 defined at the interface between the first housing 1 and the second housing 2.

The catalytic electrode 3 includes a cation exchange membrane 31, an anode 32 provided on one surface of the cation exchange membrane 31, and a cathode 33 provided on the other surface of the cation exchange membrane 31. The anode 32, the cation exchange membrane 31, the cathode 33, and the second housing 2 are disposed in sequence from the first housing 1.

The ozonated water generating device 100 supplies feed water to the anode 32 and the cathode 33 and applies DC voltage across the anode 32 and the cathode 33, so that fine bubbles of ozone are generated on the anode 32 and are dissolved in water. This operation generates ozonated water. It is noted that hydrogen is generated on the cathode 33 and is dissolved in water to yield hydrogenated water (cathodic water).

The first housing 1 includes a first hold plate 11 disposed outermost, a first support plate 13 disposed on the inner side of the first hold plate 11, and a first sheet 12 disposed between the first hold plate 11 and the first support plate 13.

The first support plate 13 is provided with a first gasket 14 on the inner surface. The first gasket 14 has a through hole (accommodating space 144), which contains a first cushion 15, the anode 32, and a grating 34.

The first hold plate 11 has a disk shape and should preferably be composed of, for example, a plastic material. The first hold plate 11 has an anodic supplying path 111 and an anodic discharging path 112 that penetrate through the first hold plate 11 from one side to the other side.

The anodic supplying path 111 receives an inserted anodic supplying pipe 91 for supplying feed water from the outside to the anode 32.

The anodic discharging path 112 receives an inserted anodic discharging pipe 92 for discharging the resulting water (ozonated water) to the outside.

A plurality of bolt openings 113 are disposed at regular intervals around the anodic supplying path 111 and the anodic discharging path 112.

The first hold plate 11 further has three pusher openings 114 disposed at regular intervals in the center of the first hold plate 11. The pusher openings 114 each receive a pushing screw 41 tightened therein and a top 421a of the protrusion of a protruding member 42 pushed by the pushing screw 41.

An O ring 43 is disposed at the periphery of the top 421a of the protrusion of each protruding member 42 to ensure water tightness (refer to FIG. 3).

The anodic supplying pipe 91 is connected, for example, to a tank that contains feed water or to a tap-water pipe, which is not shown. The anodic discharging pipe 92 is connected to, for example, a tank for storing the resulting ozonated water or a nozzle for discharging the ozonated water.

Examples of the feed water to be supplied to the anodic supplying pipe 91 include tap water and purified water.

The first support plate 13 has a disk shape having the same size as the first hold plate 11 in plan view, and has a smaller thickness than the first hold plate 11.

The first support plate 13 should preferably be composed of metal, for example.

The first support plate 13 has an anodic supplying path 131 and an anodic discharging path 132 at positions respectively corresponding to the anodic supplying path 111 and the anodic discharging path 112 of the first hold plate 11.

A plurality of bolt openings 133 are disposed at regular intervals around the anodic supplying path 131 and the anodic discharging path 132 at positions corresponding to the respective bolt openings 113 of the first hold plate 11.

The first support plate 13 further has three pusher openings 134 disposed at regular intervals in the center of the first support plate 13 at positions corresponding to the respective pusher openings 114 of the first hold plate 11. The pusher openings 134 each receive a part of a protrusion 421 of each protruding member 42.

The first sheet 12 is disposed between the first hold plate 11 and the first support plate 13, to function as a gasket to ensure water tightness between the first hold plate 11 and the first support plate 13. The first sheet 12 has a disk shape having the same size as the first hold plate 11 and the first support plate 13 in plan view. The first sheet 12 should preferably be composed of silicone, for example.

The first sheet 12 has an anodic supplying path 121 and an anodic discharging path 122 at positions respectively corresponding to the anodic supplying path 111 and the anodic discharging path 112 of the first hold plate 11.

A plurality of bolt openings 123 are formed around the anodic supplying path 121 and the anodic discharging path 122.

The first sheet 12 further has three pusher openings 124 disposed at regular intervals in the center of the first sheet 12 at positions corresponding to the respective pusher openings 114 of the first hold plate 11. The pusher openings 124 each receive a part of the protrusion 421 of each protruding member 42.

The first gasket 14 is disposed on the inner surface of the first support plate 13, and has a disk shape having the same size as the first hold plate 11 and the first support plate 13 in plan view. The first gasket 14 should preferably be composed of a fluorinated resin, Viton rubber, ethylene-propylene rubber, or any other gasket material, for example. The first gasket 14 has a lower hardness than that of the anode 32 (substrate 321), which is described below.

The first gasket 14 has an accommodating space 144 in the center, which is a circular through hole in plan view. The accommodating space 144 contains the anode 32 and the grating 34 of the catalytic electrode 3, and the first cushion 15, as is described below. In other words, the anode 32, the grating 34, and the first cushion 15 are protected by the surrounding first gasket 14.

A plurality of bolt openings 143 are formed around the accommodating space 144.

The first cushion 15 is disposed in the accommodating space 144 of the first gasket 14 to absorb the load on the anode 32 and the grating 34.

The first cushion 15 has a disk shape smaller than the first hold plate 11 in plan view. The first cushion 15 has a hardness equal to or lower than that of the first gasket 14. The first cushion 15 should preferably be composed of silicone (a silicone rubber or a silicone sponge), for example.

The first cushion 15 has an anodic supplying path 151 and an anodic discharging path 152 at positions respectively corresponding to the anodic supplying path 131 and the anodic discharging path 132 of the first support plate 13.

The first cushion 15 further has three pusher openings 154 disposed at regular intervals in the center of the first cushion 15 at positions corresponding to the respective pusher openings 114 of the first hold plate 11. The pusher openings 154 each receive a bottom 422 of each protruding member 42.

The pushing screws 41 are tightened in the upper portions of the respective pusher openings 114 of the first hold plate 11.

The protruding members 42 each have an inverted-T-shaped side cross section, i.e., have a bottom 422 and a protrusion 421 protruding from the bottom 422.

The bottoms 422 fit in the respective pusher openings 154 of the first cushion 15. The protrusions 421 fit in the respective pusher openings 134, 124, 114 of the first support plate 13, the first sheet 12, and the first hold plate 11. The O rings 43 are disposed at the peripheries of the tops 421a of the respective protrusions to ensure water tightness.

The pushing screws 41 that are tightened in the respective pusher openings 114 of the first hold plate 11 push the tops 421a of the protrusions of the respective protruding members 42 downward (toward the catalytic electrode 3) to urge the anode 32, the cation exchange membrane 31, and the cathode 33 against each other via the grating 34 (described below) and bring the components into pressure contact with each other.

With reference to FIGS. 1 to 3, the second housing 2 includes a second hold plate 21 disposed outermost, a second support plate 23 disposed on the inner side of the second hold plate 21, and a second sheet 22 disposed between the second hold plate 21 and the second support plate 23.

The second support plate 23 is provided with a second gasket 24 on the inner surface. The second gasket 24 has a through hole (accommodating space 244), which contains a second cushion 25, the cathode 33, and a grating 35.

The second hold plate 21 has a disk shape and should preferably be composed of, for example, a plastic material.

The second hold plate 21 has a cathodic supplying path 211 and a cathodic discharging path 212 that penetrate through the second hold plate 21 from one side to the other side.

The cathodic supplying path 211 receives an inserted cathodic supplying pipe 93 for supplying feed water from the outside to the cathode 33.

The cathodic discharging path 212 receives an inserted cathodic discharging pipe 94 for discharging the resulting water (cathodic water) to the outside.

A plurality of bolt openings 213 are disposed at regular intervals around the cathodic supplying path 211 and the cathodic discharging path 212.

The cathodic supplying pipe 93 is connected, for example, to a tank that contains feed water or to a tap-water pipe, which is not shown. The cathodic discharging pipe 94 is connected to, for example, a tank for storing the resulting cathodic water.

Examples of the feed water to be supplied to the cathodic supplying pipe 93 include tap water and purified water.

The second support plate 23 has a disk shape having the same size as the second hold plate 21 in plan view, and has a smaller thickness than the second hold plate 21.

The second support plate 23 should preferably be composed of metal, for example.

The second support plate 23 has a cathodic supplying path 231 and a cathodic discharging path 232 at positions respectively corresponding to the cathodic supplying path 211 and the cathodic discharging path 212 of the second hold plate 21.

A plurality of bolt openings 233 are disposed at regular intervals around the cathodic supplying path 231 and the cathodic discharging path 232 at positions corresponding to the respective bolt openings 213 of the second hold plate 21.

The second sheet 22 is disposed between the second hold plate 21 and the second support plate 23, to function as a gasket to ensure water tightness between the second hold plate 21 and the second support plate 23. The second sheet 22 has a disk shape having the same size as the second hold plate 21 and the second support plate 23 in plan view. The second sheet 22 should preferably be composed of silicone, for example.

The second sheet 22 has a cathodic supplying path 221 and a cathodic discharging path 222 at positions respectively corresponding to the cathodic supplying path 211 and the cathodic discharging path 212 of the second hold plate 21.

A plurality of bolt openings 223 are formed around the cathodic supplying path 221 and the cathodic discharging path 222.

The second gasket 24 is disposed on the inner surface of the second support plate 23, and has a disk shape having the same size as the first hold plate 21 and the first support plate 23 in plan view. The second gasket 24 should preferably be composed of a fluorinated resin, Viton rubber, ethylene-propylene rubber, or any other gasket material, for example. The second gasket 24 preferably has a lower hardness than that of the cathode 33.

The second gasket 24 has an accommodating space 244, which is a circular through hole in plan view, like the accommodating space 144 of the first gasket 14. The accommodating space 244 contains the cathode 33 and the grating 35 of the catalytic electrode 3, as is described below. In other words, the cathode 33 and the grating 35 are protected by the surrounding second gasket 24.

A plurality of bolt openings 243 are formed around the accommodating space 244.

The second cushion 25 is disposed between the second support plate 23 and the second gasket 24 to absorb the load on the second gasket 24 and the cathode 33.

The second cushion 25 has a disk shape having the same size as the second gasket 24 in plan view. The second cushion 25 should preferably be composed of a material, such as silicone (a silicone rubber or a silicone sponge), having a hardness equal to or lower than that of the second gasket 24.

Since the second cushion 25 has a hardness equal to or lower than that of the second gasket 24, the second gasket 24 is squeezed in the second cushion 25 when the ozonated water generating device 100 is assembled (during the pressure contact of the components). The second gasket 24 thus functions as a stopper and can reduce the load on the cathode 33 to prevent the cathode 33 from cracking.

The second cushion 25 has a cathodic supplying path 251 and a cathodic discharging path 252 at positions respectively corresponding to the cathodic supplying path 231 and the cathodic discharging path 232 of the second support plate 23.

A plurality of bolt openings 253 are formed around the cathodic supplying path 251 and the cathodic discharging path 252.

The catalytic electrode 3 includes the anode 32, the cation exchange membrane 31, the cathode 33, and the gratings 34, 35.

Figure 4:
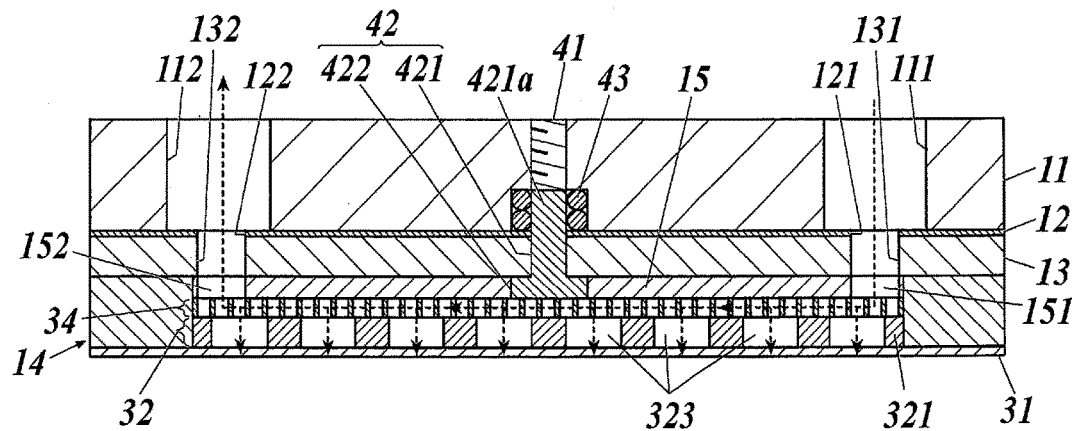
FIG. 4 This is a cross-sectional view along the line I-I in FIG. 2 illustrating a first gasket, a first cushion, a grating, an anode, and a cation exchange membrane.
Figure 5:
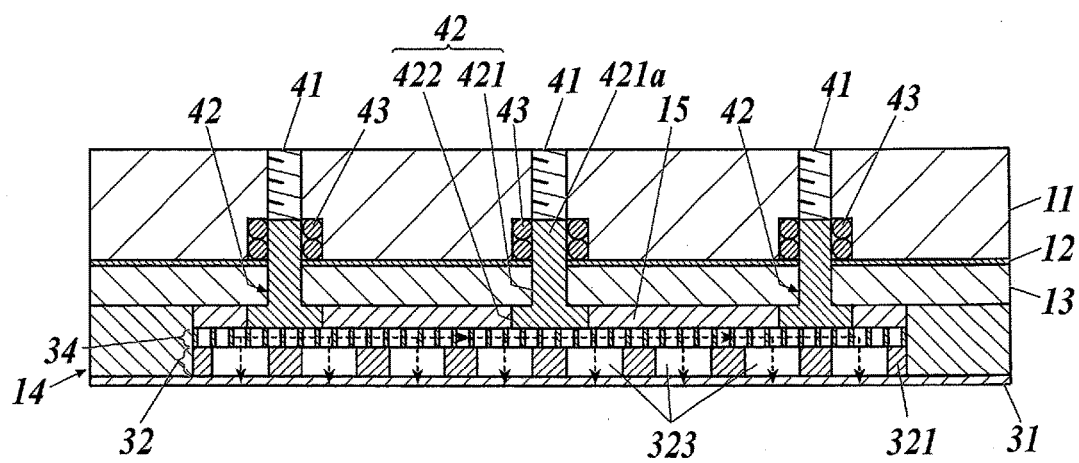
FIG. 5 This is a cross-sectional view along a line II-II in FIG. 2 illustrating a first gasket, a first cushion, a grating, an anode, and a cation exchange membrane.

FIG. 4 is a cross-sectional view along the line I-I in FIG. 2 illustrating the first gasket, the first cushion, the grating, the anode, and the cation exchange membrane. FIG. 5 is a cross-sectional view along the line II-II in FIG. 2 illustrating the first gasket, the first cushion, the grating, the anode, and the cation exchange membrane.

With reference to FIGS. 4 and 5, the anode 32 includes a circular substrate 321 in plan view.

The substrate 321 is composed of a metal that can catalyze the generation of ozone. In specific, the substrate 321 should preferably be composed of platinum, gold, or a metal coated therewith, which has high stability. In particular, the substrate 321 composed of titanium coated with platinum can be fabricated at low costs. The substrate 321 composed of silicon wafer is most preferred because it has high adhesion to, i.e., is barely separated from a diamond coating (described below).

The substrate 321 should preferably be coated with diamond on at least the surface adjacent to the first housing, to generate concentrated ozonated water.

The substrate 321 has many through holes 323 that penetrate through the substrate 321 from one side to the other side. The through holes 323 each should preferably have a diameter of approximately Φ0.5 to Φ3.0. The through holes 323 are in communication with the anodic supplying paths 111, 121, 131, 151 and the anodic discharging paths 112, 122, 132, 152 of the first hold plate 11, the first sheet 12, the first support plate 13, and the first cushion 15 via the grating 34 (described below).

The diamond can be deposited through, for example, plasma CVD or hot-filament CVD.

The anode 32 is fabricated by providing the substrate 321 with many through holes 323 through etching or laser processing, and then depositing diamond on at least the surface of the substrate 321 adjacent to the first housing through vapor deposition.

The anode 32 is disposed in and surrounded by the accommodating space 144 of the first gasket 14. The first cushion 15 is disposed on the surface of the anode 32 opposite to the cation exchange membrane 31 via the grating 34.

The grating 34 has a disk shape having the same size as the anode 32 in plan view. The grating 34 should preferably be composed of titanium or stainless steel, for example. The grating 34 is a lattice fabricated by welding wires.

The anode 32 is sized to fit in the accommodating space 144 of the first gasket 14. In specific, the anode 32 should preferably have a thickness of approximately 0.5 to 3.0 mm. The grating 34 should preferably have a thickness of approximately 0.5 to 1.0 mm. The first gasket 14 should preferably have a thickness N of approximately 1.0 to 4.0 mm.

The cation exchange membrane 31 is a thin circular film that has the same size as the first hold plate 11 in plan view.

The cation exchange membrane 31 has a plurality of bolt openings 313 disposed at regular intervals along the periphery.

The cation exchange membrane 31 may be any known membrane and can be a fluorinated cation exchange membrane that has high durability against generated ozone. The cation exchange membrane 31 should preferably have a thickness of approximately 100 to 300 µm.

The cathode 33 includes a substrate 331 that is circular in plan view, like the anode 32.

The substrate 331 is composed of a metal that can catalyze the generation of ozone. In specific, the substrate 331 should preferably be composed of platinum, gold, or a metal coated therewith, which has high stability. In particular, the substrate 331 composed of titanium coated with platinum can be fabricated at low costs. The substrate 331 composed of silicon wafer is most preferred because it has high adhesion to, i.e., is barely separated from a diamond coating (described below).

The substrate 331 has many through holes 333 that penetrate through the substrate 331 from one side to the other side. The through holes 333 each should preferably have a diameter of approximately Φ0.5 to Φ3.0. The through holes 333 are in communication with the cathodic supplying paths 211, 221, 231, 251 and the cathodic discharging paths 212, 222, 232, 252 of the second hold plate 21, the second sheet 22, the second support plate 23, and the second cushion 25 via the grating 35 (described below).

The substrate 331 should preferably be coated with diamond on at least the surface adjacent to the second housing, like the anode 32.

The cathode 33 can be fabricated through the same process as that for the anode 32.

The anode 32 and the cathode 33 respectively include substrates 321, 331 that have many through holes 323, 333 and are coated with diamond. Alternatively, the electrodes may be composed of any other material, such as an expanded metal or a punched metal, provided that the electrodes have many through holes and can be stacked on the cation exchange membrane 31 so as not to be in close contact with the entire cation exchange membrane 31 but to be in partial contact with the cation exchange membrane 31

The output terminal of a power source (not shown) is electrically connected between the anode 32 and the cathode 33 to apply DC voltage thereto. In other words, the anode 32 and the cathode 33 are connected to the power source via leads. The DC voltage to be applied should preferably be within the range of 6 to 24 V, for example.

As described above, the anode 32 is in contact with one surface of the cation exchange membrane 31 whereas the cathode 33 is in contact with the other surface, and the gratings 34, 35 are respectively disposed on the surfaces of the anode 32 and the cathode 33 opposite to the cation exchange membrane 31. These components are brought into pressure contact with each other to form the catalytic electrode 3.

The procedure for assembling the ozonated water generating device 100 will now be explained. With reference to FIG. 2, the second hold plate 21, the second sheet 22, the second support plate 23, the second cushion 25, and the second gasket 24 are stacked in sequence from the bottom. The grating 35 and the cathode 33 are then disposed in the accommodating space 244 of the second gasket 24. The cation exchange membrane 31 and the first gasket 14 are stacked on the second gasket 24. The anode 32, the grating 34, and the first cushion 15 are then disposed in the accommodating space 144 of the first gasket 14.

The pusher openings 154 in the first cushion 15 receive the bottoms 422 of the respective protruding members 42.

The first support plate 13 and the first sheet 12 are then stacked on the first cushion 15, such that the pusher openings 134, 124 respectively disposed in the first support plate 13 and the first sheet 12 receive the protrusions 421 of the respective protruding members 42.

The first hold plate 11 is then stacked on the first sheet 12, such that the pusher openings 114 in the first hold plate 11 receive the tops 421a of the protrusions of the respective protruding members 42.

Figure 6A:
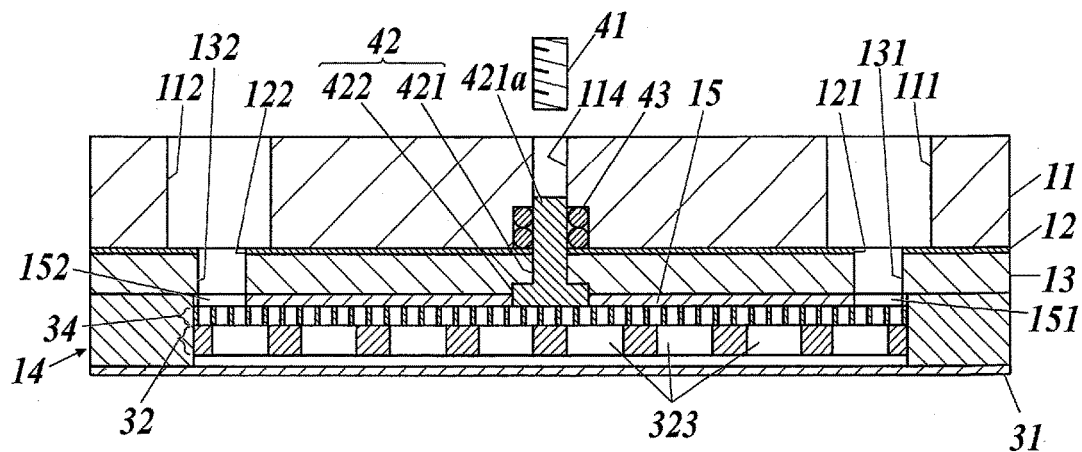
FIG. 6A This is a cross-sectional view of a catalytic electrode before the pressure contact.
Figure 6B:
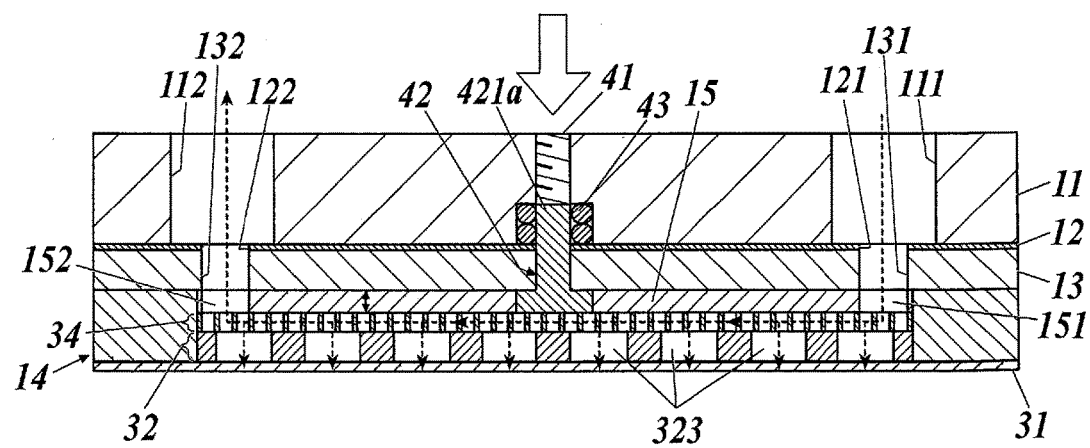
FIG. 6B This is a cross-sectional view of a catalytic electrode during the pressure contact.

With reference to FIG. 6A, the pushing screws 41 are then tightened in the respective pusher openings 114 to push the tops 421a of the protrusions of the protruding members 42. The protruding members 42 thus urge the anode 32, the cation exchange membrane 31, and the cathode 33 against each other via the grating 34, as illustrated in FIG. 6B.

The first cushion 15, which was compressed as illustrated in FIG. 6A, expands to come into close contact with both the grating 34 and the first support plate 13 without a space therebetween. This configuration ensures water tightness. The feed water can thus be certainly supplied to the anode 32 and the cation exchange membrane 31, as illustrated with dashed arrows in FIG. 6B, without leakage to unintended portions or the outside. This configuration enables concentrated ozonated water to be generated with high efficiency.

Since the pushing screws 41 and the protruding members 42 are disposed at regular intervals in the centers of the anode 32 and the grating 34, the grating 34 is evenly pushed to evenly urge the anode 32, the cation exchange membrane 31, and the cathode 33 against each other.

Although the anode 32 is depicted to have a space from the cation exchange membrane 31 in FIG. 6A, the anode 32 is actually overlaid on the cation exchange membrane 31. FIG. 6A illustrates a space between the cation exchange membrane 31 and the anode 32 for descriptive purposes, i.e., to clarify the difference from FIG. 6B illustrating the cation exchange membrane 31 and the anode 32 that are brought into closer contact with each other by the pressure of the pushing screws 41.

Bolts M are inserted and screwed in the bolt openings 113, 123, 133, 143, 153, 213, 223, 233, 243, 253 of the respective components to fasten the components together. This process completes the assembly of the ozonated water generating device 100.

Although the components are stacked in sequence from the bottom component in FIG. 2 in the above procedure for assembling the ozonated water generating device 100, the components may also be stacked in other orders, for example, in sequence from the top component in FIG. 2. In this case, the second hold plate 21, the second sheet 22, the second support plate 23, and the second cushion 25 have pusher openings, and pushing screws and protruding members urge the cathode 33, the cation exchange membrane 31, and the anode 32 against each other via the grating 35.

Alternatively, the pushing screws 41 and the protruding members 42 may be provided to not only the anode side but both the anode and cathode sides, to bring the anode 32, the cation exchange membrane 31, and the cathode 33 into pressure contact with each other.

In FIG. 2, reference numerals 5, 6, 7, and 8 indicate flow paths defined in the assembled generating device.

In the assembled ozonated water generating device 100, the anodic supplying paths 111, 121, 131, 151 respectively provided in the first hold plate 11, the first sheet 12, the first support plate 13, and the first cushion 15 are in communication with each other to define a single anodic supplying path 5. The anodic supplying path 5 leads to the through holes 323 of the anode 32 via the grating 34.

In addition, the anodic discharging paths 112, 122, 132, 152 respectively provided in the first hold plate 11, the first sheet 12, the first support plate 13, and the first cushion 15 are in communication with each other to define a single anodic discharging path 6. The anodic discharging path 6 leads to the through holes 323 of the anode 32 via the grating 34.

In addition, the anodic discharging paths 112, 122, 132, 152 respectively provided in the first hold plate 11, the first sheet 12, the first support plate 13, and the first cushion 15 are in communication with each other to define a single anodic discharging path 6. The anodic discharging path 6 leads to the through holes 323 of the anode 32 via the grating 34.

In the same manner, the cathodic supplying paths 211, 221, 231, 251 respectively provided in the second hold plate 21, the second sheet 22, the second support plate 23, and the second cushion 25 are in communication with each other to define a single cathodic supplying path 7. The cathodic supplying path 7 leads to the through holes 333 of the cathode 33 via the grating 35.

In addition, the cathodic discharging paths 212, 222, 232, 252 respectively provided in the second hold plate 21, the second sheet 22, the second support plate 23, and the second cushion 25 are in communication with each other to define a single cathodic discharging path 8. The cathodic discharging path 8 leads to the through holes 333 of the cathode 33 via the grating 35.

It is noted that a level sensor (not shown) is disposed downstream of the anodic discharging pipe 92. The level sensor includes a sensing electrode (not shown), a reference electrode (not shown) that is the basis of potential measurement, and a potentiometer (not shown) connected to one end of each of the sensing electrode and the reference electrode to detect potentials, etc. The sensing electrode and the reference electrode come into contact with ozonated water flowing through the anodic discharging pipe 92. Through the contact of the sensing electrode and the reference electrode with the ozonated water, the level sensor determines the concentration through detection of a potential difference of the sensing electrode from the reference electrode in response to a variation in the concentration of ozone.

The sensing electrode should preferably be composed of platinum or gold, whereas the reference electrode should preferably be composed of silver or silver chloride, for example.

On the basis of the detected concentration of ozone, a controller (not shown) in the ozonated water generating device 100 controls the electrical energy applied across the anode 32 and the cathode 33 from the power source, such that the detected concentration equals a predetermined concentration of ozone.

The operations of the ozonated water generating device 100 will now be explained.

While feed water is being supplied through the anodic supplying pipe 91 and the cathodic supplying pipe 93, the power source is driven to apply a predetermined voltage across the anode 32 and the cathode 33. This energization causes electrolysis of water, to generate bubbles of ozone and oxygen on the anode and generate bubbles of hydrogen on the cathode.

In specific, as illustrated with arrows in FIGS. 2 and 3, the feed water supplied through the anodic supplying pipe 91 flows through the anodic supplying paths 111, 121, 131, 151, the grating 34, and the through holes 323, to come into contact with the entire anode 32 disposed in the accommodating space 144 and with the cation exchange membrane 31.

The anode 32 in contact with the feed water causes generation of bubbles of ozone, which are dissolved in the feed water to yield concentrated ozonated water. The resulting ozonated water flows from the through holes 323 through the grating 34 and the anodic discharging paths 152, 132, 122, 112, to be discharged through the anodic discharging pipe 92 to the outside.

The feed water supplied through the cathodic supplying pipe 93 flows through the cathodic supplying paths 211, 221, 231, 251, the grating 35, and the through holes 333a, to come into contact with the entire cathode 33 disposed in the accommodating space 244 and with the cation exchange membrane 31.

The cathode 33 in contact with the feed water causes generation of bubbles of hydrogen, which are dissolved in the feed water to yield hydrogenated water (cathodic water). The resulting hydrogenated water flows from the through holes 333 through the grating 35 and the cathodic discharging paths 252, 232, 222, 212, to be discharged through the cathodic discharging pipe 94 to the outside.

During the energization, the level sensor simultaneously detects the concentration of ozonated water in the anodic discharging pipe 92, whereas the controller controls the electrical energy applied across the anode 32 and the cathode 33 through the adjustment of the output from the power source to acquire the predetermined concentration of ozone. This operation generates ozonated water having the predetermined concentration.

Figure 8A:
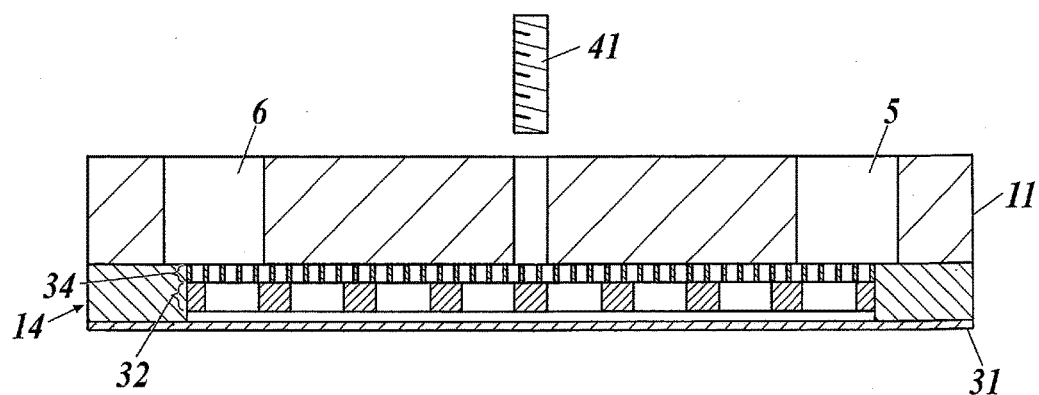
FIG. 8A This is a cross-sectional view of a catalytic electrode before the pressure contact in a conventional configuration.
Figure 8B:
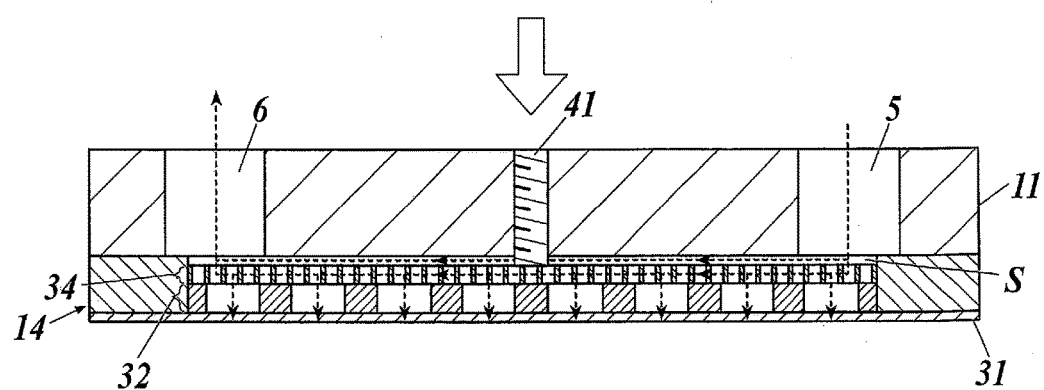
FIG. 8B This is a cross-sectional view of a catalytic electrode during the pressure contact in the conventional configuration.

According to the embodiment, the first cushion 15 is disposed between the anode 32 (grating 34) and the first housing 1 (first support plate 13). The first housing 1 is provided with a pusher that includes a pushing screw 41 and a protruding member 42 and penetrates through the first housing 1 to directly push the catalytic electrode 3. The pusher is disposed at a position that ensures pushing on at least the center of the catalytic electrode 3. The pressure of the pusher on the catalytic electrode 3 brings the anode 32, the cation exchange membrane 31, and the cathode 33 into pressure contact with each other. In contrast to the conventional configuration including no cushion as illustrated in FIG. 8, according to the invention, when the pusher directly pushes the catalytic electrode 3 to move the catalytic electrode 3 downward, the space between the first housing 1 and the catalytic electrode 3 is filled with the expanded first cushion 15 that was compressed. This configuration can ensure water tightness between the first housing 1 and the catalytic electrode 3. The feed water can thus be certainly supplied to the anode 32 and the cation exchange membrane 31 to generate ozonated water, without leakage to unintended portions such as the space between the first housing 1 and the catalytic electrode 3. This configuration enables concentrated ozonated water to be generated with high efficiency.

Since the pusher is disposed at a position that ensures pushing on at least the center of the catalytic electrode 3, the pusher can evenly urge the anode 32, the cation exchange membrane 31, and the cathode 33 against each other. This configuration also contributes to generation of concentrated ozonated water with high efficiency.

The generating device includes a plurality of pushers, which are disposed at regular intervals at positions that ensure pushing on at least the center of the catalytic electrode 3. This configuration can achieve more even pressure contact of the catalytic electrode 3 to increase the concentration of the resulting ozonated water.

The first cushion 15 is composed of silicone having high adhesion and thus can improve the water tightness between the first housing 1 and the catalytic electrode 3. This configuration can enhance the efficiency of generating ozonated water and contributes to generation of concentrated ozonated water.

The pushers each include a protruding member 42 to directly push the grating 34 and a pushing screw 41 to push the protruding member 42. The anode 32 is thus pushed by the bottoms 422 of the protruding members 42 through larger contact areas compared to the pushing screws 41 alone directly pushing the grating 34. This configuration can tighten the pressure contact. The O rings 43 disposed at the peripheries of the tops 421a of the protrusions of the respective protruding members 42 can ensure water tightness.

The invention should not be limited to the above embodiment and can be appropriately modified within the scope of the invention.

Figure 7:
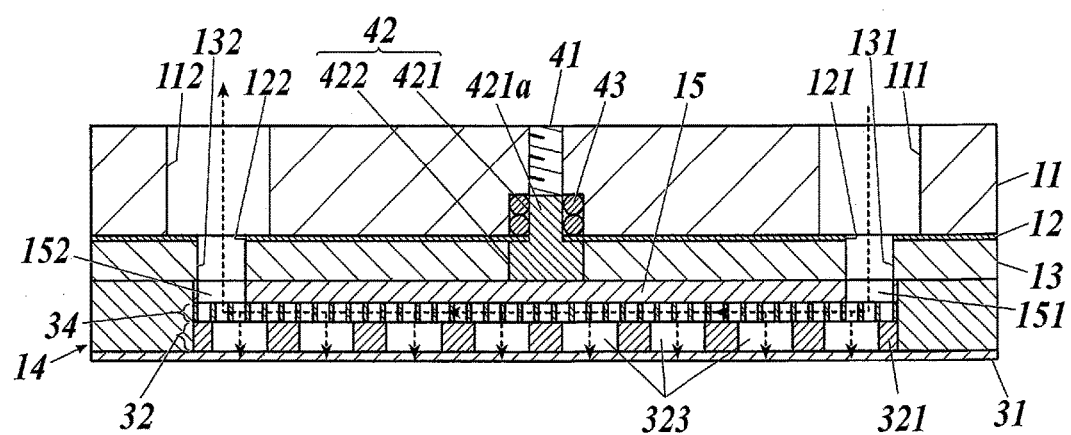
FIG. 7 This is a cross-sectional view illustrating a first gasket, a first cushion, a grating, an anode, and a cation exchange membrane according to a modified embodiment of the invention.

According to the embodiment, the pushing screws 41 and the protruding members 42 directly push the grating 34 to urge the anode 32 against the cation exchange membrane 31 via the grating 34. Alternatively, for example, as illustrated in FIG. 7, the pushing screws 41 and the protruding members 42 may directly push the first cushion 15 to urge the grating 34 and the anode 32 against the cation exchange membrane 31 via the first cushion 15.

Although the pushing screws 41 and the protruding members 42 are used to urge the anode 32 against the cation exchange membrane 31 according to the embodiment, the pushing screws 41 alone may be used without the protruding members 42.

Although three pushing screws 41 and three protruding members 42 are used in the above description, any number of pushing screws 41 and protruding members 42 may be used provided that they can push at least the centers of the anode 32 and the cation exchange membrane 31.

INDUSTRIAL APPLICABILITY

The invention is directed to an ozonated water generating device that can generate concentrated ozonated water with high efficiency.

DESCRIPTION OF REFERENCE NUMERALS 1 first housing
2 second housing
3 catalytic electrode
15 first cushion
31 cation exchange membrane
32 anode
33 cathode
100 ozonated water generating device
5, 111, 121, 131, 151 anodic supplying path
6, 112, 122, 132, 152 anodic discharging path
7, 211, 221, 231, 251 cathodic supplying path
8, 212, 222, 232, 252 cathodic discharging path
141, 241 accommodating space
41 pushing screw (pusher)
42 protruding member (pusher)

The invention claimed is:
1. An ozonated water generating device comprising:
a first housing;
a second housing stacked with the first housing; and a catalytic electrode disposed in an accommodating space defined in a stack of the first housing and the second housing, the catalytic electrode comprising an anode, a cation exchange membrane, and a cathode in sequence from the first housing, wherein:

the ozonated water generating device supplies feed water to the catalytic electrode and applies DC voltage across the anode and the cathode to generate ozonated water, the first housing comprises an anodic supplying path and an anodic discharging path in communication with the accommodating space, the anodic supplying path supplying feed water to the anode of the catalytic electrode, and the anodic discharging path discharging resulting water, the second housing comprises a cathodic supplying path and a cathodic discharging path in communication with the accommodating space, the cathodic supplying path supplying feed water to the cathode of the catalytic electrode, and the cathodic discharging path discharging resulting water, the ozonated water generating device further comprises a cushion provided at at least one of (i) a first position between the catalytic electrode and the first housing, such that the cushion is in contact with the catalytic electrode and the first housing and comprises an anodic supplying path and an anodic discharging path at positions respectively corresponding to the anodic supplying path and the anodic discharging path of the first housing, and (ii) a second position between the catalytic electrode and the second housing, such that the cushion is in contact with the catalytic electrode and the second housing and comprises a cathodic supplying path and a cathodic discharging path at positions respectively corresponding to the cathodic supplying path and the cathodic discharging path of the second housing, the ozonated water generating device further comprises at least one pusher in at least one of the first housing and the second housing, the at least one pusher penetrating through the first housing or the second housing to directly push the catalytic electrode, the at least one pusher is disposed at a position that ensures pushing on at least the center of the catalytic electrode, and the pressure of the at least one pusher on the catalytic electrode brings the anode, the cation exchange membrane, and the cathode into pressure contact with each other while at least one of a space between the first housing and the catalytic electrode and a space between the second housing and the catalytic electrode is filled with the cushion being expanded such that the cushion maintains contact with the catalytic electrode and a respective one of the first and second housings without a space therebetween.

2. The ozonated water generating device according to claim 1, wherein:

the at least one pusher comprises a plurality of pushers, and the plurality of pushers are disposed at regular intervals at positions that ensure pushing on at least the center of the catalytic electrode.

3. The ozonated water generating device according to claim 1, wherein the cushion is made of silicone.

4. The ozonated water generating device according to claim 2, wherein the cushion is made of silicone.

* * * * *